Patented June 5, 1934

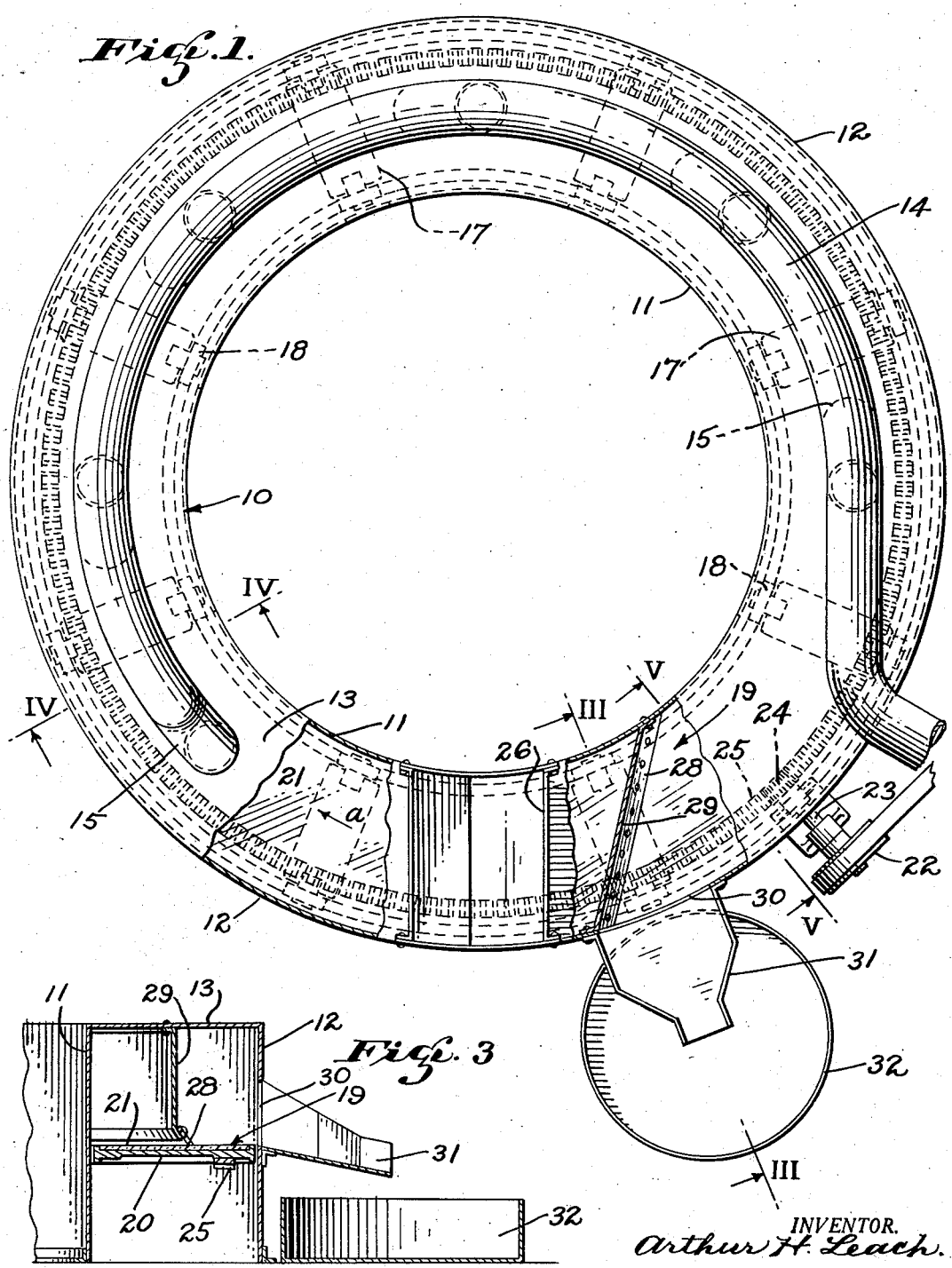

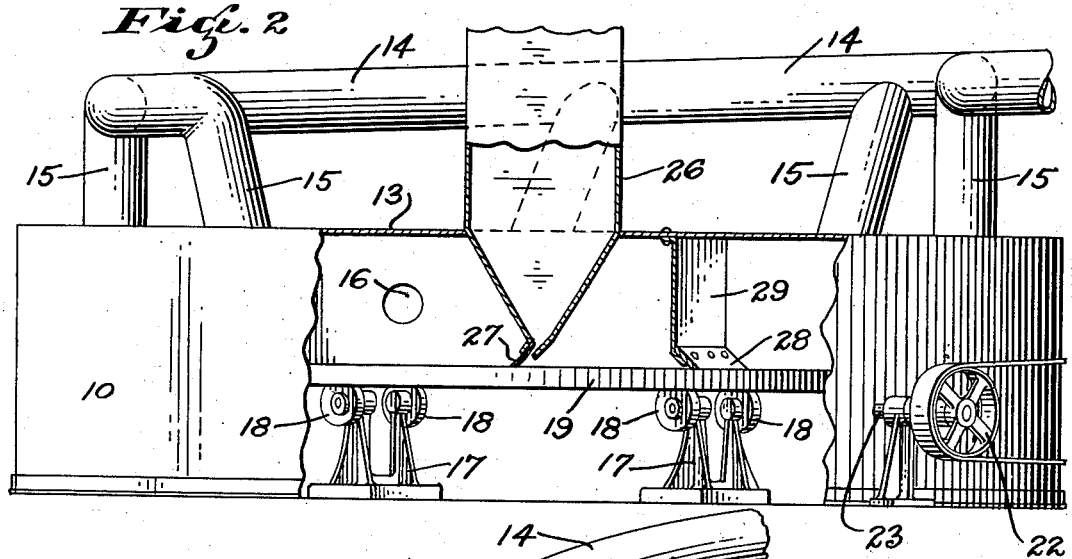
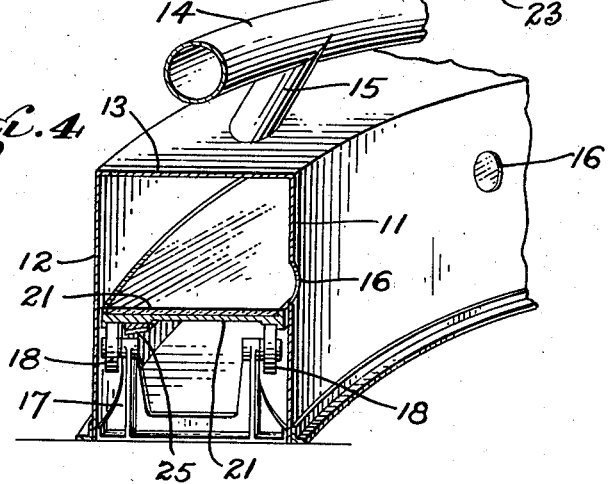
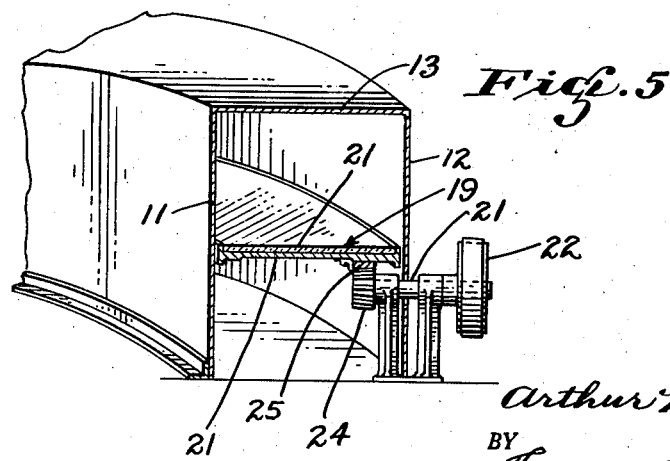

1,961,770

UNITED STATES PATENT OFFICE 1,961,770

PROCESS AND APPARATUS FOR DEHYDRATING EGGS

Arthur H. Leach, Hayward, Calif., assignor of one-half to Carl Ruh, Oakland, Calif.

Application April 4, 1932, Serial No. 603,103
Renewed March 24, 1934

1 Claim. (Cl. 159—10)

This invention relates to a process and apparatus for dehydrating eggs.

It is the object of the present invention to provide a process and apparatus for dehydrating eggs, in which the dehydrating is complete, and accomplished in an expedient and sanitary manner, and in which the mechanism employed is simple in construction and inexpensive to operate.

This object is accomplished through the provision of an annular smooth surfaced table having means for continuously rotating it within a housing, through which housing heated air is circulated. The eggs to be dehydrated are broken and, after being stirred or mixed, are applied in the form of a viscous liquid to the table at one point, carried by the table through the warm air in the housing, the action of the air serving to dry or dehydrate them, and then scraped from the table after they have become dehydrated.

One form which the invention may assume is exemplified in the following description and illustrated by way of example in the accompanying drawings, in which:

Fig. 1 is a plan view of an egg dehydrator embodying my invention with parts thereof broken away.

Fig. 2 is a side elevation of the dehydrator also having parts broken away to disclose the mechanism otherwise concealed by the outer house.

Fig. 3 is a section taken on the line III—III of Fig. 1.

Fig. 4 is a perspective view of the portion of the dehydrator being cut away to expose a section at the line IV—IV of Fig. 1.

Fig. 5 is also a perspective view exposing a section of the dehydrator at the line V—V of Fig. 1.

Referring more particularly to the accompanying drawings, I show an annular housing generally indicated at 10. The housing 10 consists of vertical annular inner and outer walls 11 and 12 respectively and a top plate 13. The floor upon which the housing is disposed may serve as a bottom for the housing, as shown, or if desired a bottom plate may be provided. Heated air from a source of supply not shown is delivered to the interior of the housing through a manifold pipe 14 from which the air passes to the housing through a plurality of branch pipes 15 opening into the housing at spaced intervals as shown. Exhaust ports 16 are spaced about the inner wall 11 so that the air may pass outwardly therethrough and if desired these exhaust ports may be connected with a suitable flue or with a return pipe so that the exhaust air may be dried and re-used.

Arranged within the housing at spaced intervals, as is most clearly shown in Figs. 1 and 2, are a plurality of bearing brackets 17. These brackets rest upon the floor or bottom of the housing and each bracket supports a pair of roller members 18.

Supported by the rollers 18 for movement through the housing is an annular table generally indicated at 19. The table 19 consists of a flat annular plate 20 formed of any suitable rigid material and supporting a top member of glass such as illustrated at 21. While the top member 21 is described as being made of glass, it will be obvious from a further description of the device that other materials will serve the same purpose. It is essential, however, that the top surface of the table 19 be substantially planar and free from roughness. It is also desirable that the table top be composed of a substance that is easily cleaned for purposes of sanitation. The table 19 being wholly supported by the rollers 18 is free for movement relative to the housing and in order to move the table, a suitable driving means, not shown, is connected with a pulley 22 disposed exteriorly of the housing and fixed to a shaft 23.

The shaft 23 extends to a position within the housing and supports a pinion 24 at its inner end. The pinion 24 is in mesh with a large ring gear illustrated at 25 and fixed to the under side of the table 19 so that upon rotation of the pulley 22 by a motor or the like the table 19 is caused to revolve within the housing at a greatly reduced speed.

The top 13 of the housing is provided with an opening at one point and fitted within this opening is a feed hopper 26. The hopper 26 may be of any convenient shape, but preferably tapers at its bottom to a point adjacent the top surface of the table 19 and is there provided with an opening extending transversely of the table and containing a brush member 27.

The brush member 27 is composed of bristles fixed in the opening of the hopper and extending downwardly to contact with the top surface of the table 19.

The direction of movement of the table 19 is indicated by an arrow $a$ in Fig. 1. In the opposite direction from the feed hopper and spaced a short distance therefrom is provided a scraper 28.

The scraper 28 is in the form of a more or less flexible blade member contacting the table 19 and supported as shown by a bracket 29. The scraper blade 28 is disposed at an angle against the top of the table, and directly adjacent its outer end the outer wall 21 of the housing is provided with an opening 30 against the side of which is a chute or spout 31.

In the operation of the device the eggs to be dehydrated are first broken. The part of the eggs to be dehydrated, that is, either the whites or yolks or if desired both the whites and yolks, are then thoroughly mixed or beaten up and poured into the feed hopper 26. The hopper thus contains the eggs in a viscous fluid state. The bristles of the brush 27 are not too tightly clamped between the lower edges of the hopper 26 and as a result the eggs in fluid form seep downwardly between the bristles partly due to gravitation and partly due to capillary attraction.

As the table 19 is slowly revolving, the brush in effect paints it or coats it with the eggs from the hopper 26. As the table revolve this thin coating of egg upon it is subjected to the action of heated air within the housing. The quantity of egg applied and the heat of the air being so adjusted that the egg is thoroughly dried before it reaches the point at which the scraping knife 28 crosses the table. Hence, when the dried egg reaches the scraping knife it is scraped from the table thereby and due to the angular disposition of the knife is caused to move outwardly through the opening 30 from which it slides down the spout 31 and is deposited in a suitable receptacle such as illustrated at 32.

The dried egg, when it reaches the receptacle 32 is in the form of a flaky substance approximately the consistency of bran and may be placed into suitable cans or receptacles for storage and dispensing.

It will be seen from the foregoing that I have provided a device for dehydrating eggs that eliminates as far as possible the handling of the eggs, that is simple in construction and operation and thorough in accomplishment of the desired object.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

An apparatus of the character described comprising an annular housing consisting of vertical annular inner and outer walls and a top, said housing having a floor forming the bottom thereof, means for delivering heated air to the housing through the top thereof at spaced points thereabout, the inner wall of the housing having spaced exhaust ports formed therein, an annular table arranged within the housing at a point intermediate the top and bottom thereof and parallel to the top and bottom, the width of said table being just slightly less than the width of the housing, a plurality of supports positioned beneath the table, a pair of rollers carried by each of said supports and engaging the table, a ring gear fixed to the underside of the table, a pinion in mesh with said ring gear, means for driving the pinion to impart rotation to the table, a hopper arranged above the table for the reception of eggs in liquid form, a discharge opening at the bottom of said hopper at a point contiguous to the top of the table, a brush fixed at one edge of said discharge opening and contacting the table to spread the eggs upon the table, and scraping means contacting the table to remove the dried eggs therefrom.

ARTHUR H. LEACH.